March 24, 1931.    H. SCHMIDT    1,797,699
STEP TOOTHED DRUM CALCULATING MACHINE
Filed Jan. 26, 1927    3 Sheets-Sheet 1

INVENTOR
Hermann Schmidt
by Lorke, Kehlenbeck & Farley
Attorneys

March 24, 1931.  H. SCHMIDT  1,797,699

STEP TOOTHED DRUM CALCULATING MACHINE

Filed Jan. 26, 1927  3 Sheets-Sheet 2

INVENTOR
Hermann Schmidt
by
Sooka, Kehlenbeck & Farley
Attorneys

March 24, 1931. H. SCHMIDT 1,797,699
STEP TOOTHED DRUM CALCULATING MACHINE
Filed Jan. 26, 1927 3 Sheets-Sheet 3

INVENTOR
Hermann Schmidt
by Lorke, Kehlenbeck & Farley
Attorneys

Patented Mar. 24, 1931

1,797,699

UNITED STATES PATENT OFFICE

HERMANN SCHMIDT, OF SOMMERDA, GERMANY, ASSIGNOR TO RHEINISCHE METALL-WAAREN-UND MASCHINENFABRIK SÖMMERDA AKTIENGESELLSCHAFT, OF SOM-MERDA, GERMANY, A CORPORATION OF GERMANY

STEP-TOOTHED DRUM CALCULATING MACHINE

Application filed January 26, 1927, Serial No. 163,675, and in Germany February 25, 1926.

The invention relates to calculating machines having step toothed calculating drums (Thomas type) wherein numbers are set up in the machine in known manner by rotation of drums or wheels composed of mutilated gears, as shown in greater detail, for example, in the co-pending application of August Kottmann, Serial No. 320,804. All modern calculating machines that have actuating wheels fitted with individually adjustable teeth (Odhner type) are fitted with locking gears which prevent a rotation of the operating crank as long as the members destined to zero-set the totalizers are out of their position of rest, and which, inversely, prevent an actuation of the clearing members as soon as the operating crank leaves its initial position.

My invention has for its object to provide a locking gear of the character mentioned for calculating machines having step toothed calculating drums, which locking gear is adapted to the special conditions of these machines. My invention comprises the feature, that the locking member allotted to the clearing members is constituted by a recessed locking bar, the number of its recesses corresponding to that of the orders to which the totalizer of the machine may be shifted. The springs designed to return the clearing members and said locking bar are so tensioned that the clearing members are actuated only when they have come out of engagement with all the totalizer wheels, that is, when all said wheels have been duly set to zero.

In order to permit my invention to be more easily understood, an embodiment of same is illustrated in the drawings which accompany and form part of this specification.

Figure 1:
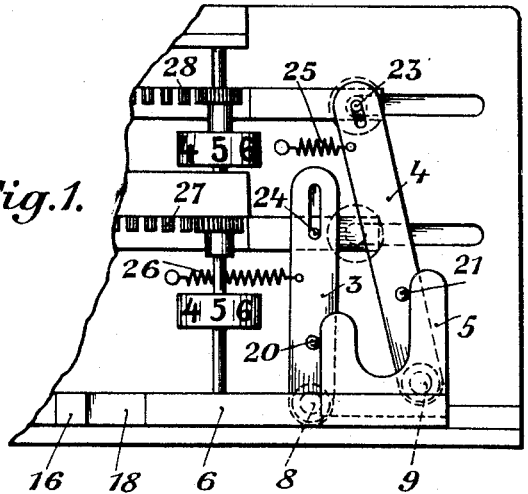
Fig. 1 is a view from below of the mechanism, all members being in position of rest.
Figure 2:
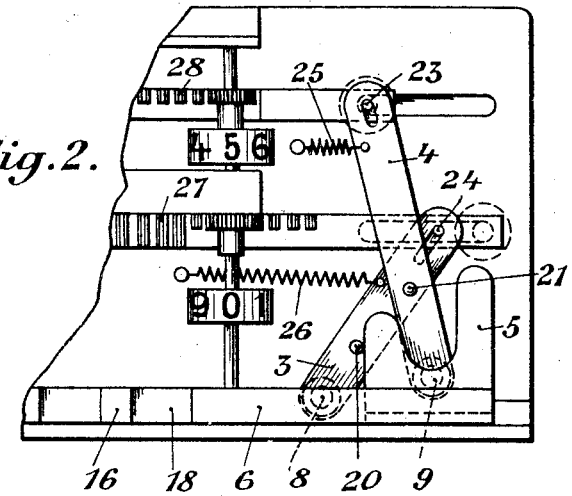
Figs. 2 and 3 are views similar to Fig. 1, one of the clearing members being set.
Figure 3:
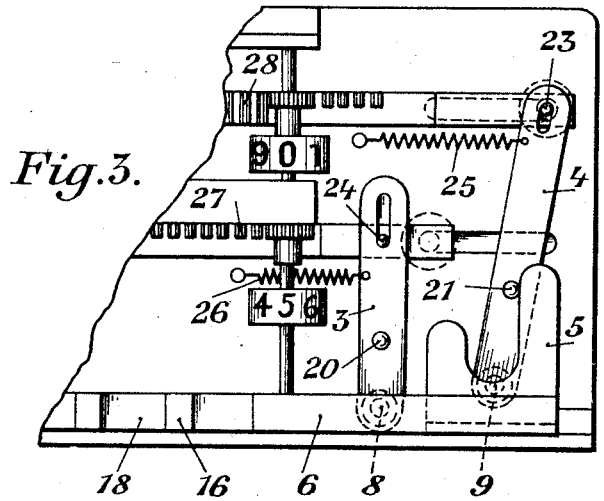

Referring now to these figures, 1 and 2 are the clearing knobs which engage by pins 23 and 24 levers 3 and 4. The latter are mounted for rocking motion on shafts 8 and 9. The levers 3 and 4 have fixed on them pins 20 and 21 adapted to act upon a presser piece 5 when the clearing knobs 1, 2 are actuated. The presser piece 5 is fast on a locking bar 6 which has recesses 18 and intermediate full portions 16.

The crank 15 which operates the step toothed drums, rotates, through the intermediary of a pair of bevel wheels 19 and a shaft 14, a locking disk 11 having a notch 10. Shaft 14 may at the same time carry one of the drums.

Figure 4:
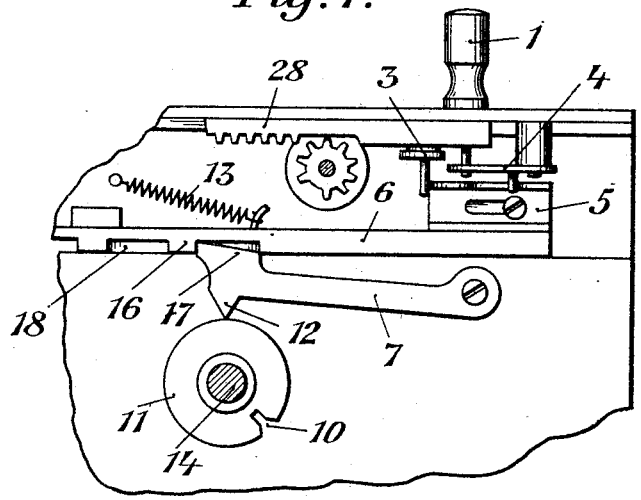
Fig. 4 is an elevation, the operating crank being out of position of rest.
Figure 5:
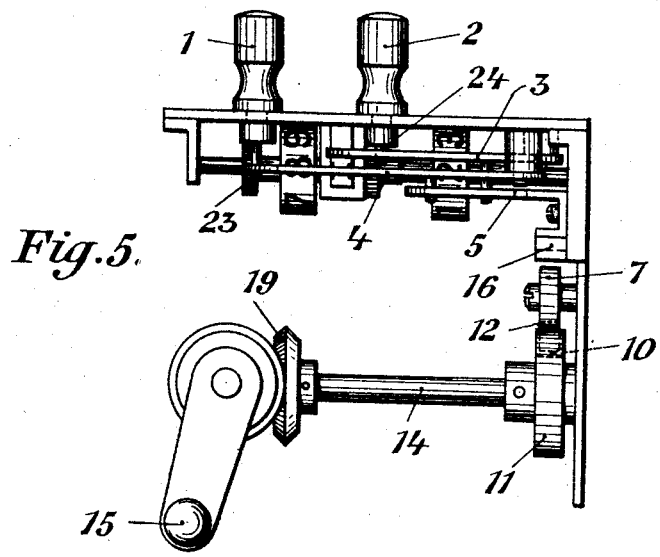
Fig. 5 is a lateral view showing in particular the actuation of the locking gear by the driving shaft of the step toothed drums.
Figure 6:
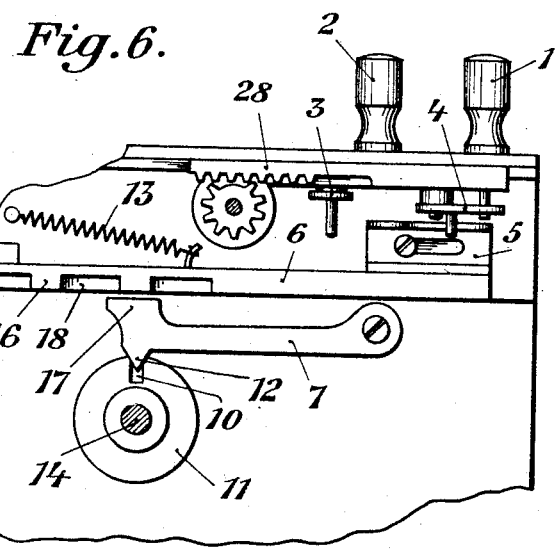
Fig. 6 is an elevation, the operating crank assuming zero position, one of the clearing members having been set incompletely.

A locking lever 7, see Figs. 4, 5 and 6, is so arranged between the locking bar 6 and locking disk 11, that the locking bar 6 is released only when the nose 12 of the locking lever 7 enters the notch 10 of locking disk 11, and that, inversely, locking disk 11 is released only if a lug 17 of lever 7 enters a recess 18 of locking bar 6.

The recesses 18 of the locking bar 6 and the notch 10 of locking disk 11 are so arranged, that lug 17 of locking lever 7 may enter said recess 18 only if the clearing knobs 1 and 2 are in position of rest, and that the nose 12 of the locking lever 7 may enter the notch 10 of the locking disk 11 only if the operating crank assumes its position of rest.

The nose 12 of locking lever 7 and the notch 10 have inclined faces, so that nose 12 may be urged out of notch 10, when a sufficiently strong turning moment is exerted on the operating crank 15. If, however, a full portion 16 of locking bar 6, instead of a recess 18, is opposite the lug 17 of lever 7, the nose 12 is unable to be lifted; the operating crank 15 is thus locked.

When the operating crank 15 does not assume zero position, so that the nose 12 rests on the full circumference of locking disk 11, as shown in Fig. 4, and lug 17 engages one of the recesses 18 of locking bar 6, then, inversely, the clearing knobs 1, 2 are locked by the operating crank.

As shown, the locking bar 6 has a plurality of recesses 18, as in multiplying and dividing operations the slide carrying the totalizers is shifted.

Furthermore, the tension of the return springs 13, 25 and 26 is so determined, that it will serve to return the empty clearing knobs into initial position, if all toothed numeral wheels are in the zero position and thereby are brought out of engagement with their actuating rack bars. If, however, even only one toothed wheel has not been brought to the zero position, due to careless manipulation of the knobs 1, 2, this wheel remains in mesh with the clearing rack 27 and 28, respectively. As the numeral wheels are feebly braked to prevent them from being overthrown in the clearing operation, the force required for carrying the drum which is not in its zero position along, is so great, that the springs are no longer able to return the racks 27, 28 and the clearing knobs 1, 2 to position of rest. When this happens, one of the full portions 16 of the locking bar 6 comes to a position opposite the lug 17 of locking lever 7, so that the actuation of the machine is locked, as explained above. Therefore, the calculation can be continued only if or not before, all toothed wheels have duly been set to zero position.

What I claim as my invention and desire to secure by Letters Patent, is:—

1. In a calculating machine having step toothed calculating wheels, the combination with the driving mechanism and clearing mechanism thereof, of means for locking either of said mechanisms when the other is out of its zero position, comprising a movable latch, a locking member engageable by said latch and associated with each of said driving and clearing mechanisms and movable thereby, said latch and locking members being so disposed that said latch releases one of said members only when it enters the other of said members and can enter either of said members only when the mechanism associated with the member is in its zero position, and one or more springs connected with said clearing mechanism and urging the same into the zero position, said spring or springs being of such strength as to be capable of moving the clearing mechanism only when the latter has become disengaged from all of the numeral wheels.

2. The combination as set forth in claim 1, wherein said clearing mechanism comprises two clearing members, and wherein the locking member associated with the clearing mechanism comprises a locking bar, and a lever operatively associated with each of said clearing members and actuatable thereby to shift said locking bar.

In testimony whereof I have affixed my signature.

HERMANN SCHMIDT.